(12) United States Patent
Nishida et al.

(10) Patent No.: US 7,332,070 B2
(45) Date of Patent: Feb. 19, 2008

(54) METHOD OF PREVENTING HEAT EXCHANGER FOULING

(75) Inventors: Hiroto Nishida, Ichihara (JP); Kouji Kishinami, Ichihara (JP); Tomohiro Arase, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/555,080

(22) PCT Filed: Jul. 15, 2004

(86) PCT No.: PCT/JP2004/010435

§ 371 (c)(1),
(2), (4) Date: Oct. 31, 2005

(87) PCT Pub. No.: WO2005/005487

PCT Pub. Date: Jan. 20, 2005

(65) Prior Publication Data

US 2006/0241252 A1    Oct. 26, 2006

(30) Foreign Application Priority Data

Jul. 15, 2003    (JP) .............................. 2003-197300

(51) Int. Cl.
*C10G 75/04*    (2006.01)
*C08F 6/00*    (2006.01)

(52) U.S. Cl. ...................... 208/48 AA; 208/348; 203/7; 203/64; 528/484; 585/3; 585/950

(58) Field of Classification Search .......... 208/48 AA, 208/348; 203/7, 64; 526/74; 585/3, 950; 528/484

See application file for complete search history.

(56) References Cited

U.S. PATENT DOCUMENTS

| | | | | |
|---|---|---|---|---|
| 3,224,957 A | * | 12/1965 | Kent ...................... | 208/48 AA |
| 4,200,518 A | | 4/1980 | Mulvany | |
| 4,397,737 A | * | 8/1983 | Kray ...................... | 208/48 AA |
| 4,952,649 A | | 8/1990 | Kioka et al. | |
| 5,026,795 A | * | 6/1991 | Hogan .......................... | 526/74 |
| 5,037,905 A | | 8/1991 | Cummings et al. | |
| 5,200,502 A | | 4/1993 | Kao et al. | |
| 5,792,895 A | | 8/1998 | Commereuc et al. | |
| 5,817,905 A | | 10/1998 | Commereuc et al. | |

FOREIGN PATENT DOCUMENTS

| | | |
|---|---|---|
| JP | 55-129490 A | 10/1980 |
| JP | 58-83006 A | 5/1983 |
| JP | 4-13703 A | 1/1992 |
| JP | 5-186505 A | 7/1993 |
| JP | 6-184231 A | 7/1994 |
| JP | 7-25946 A | 1/1995 |
| JP | 10-45635 A | 2/1998 |
| JP | 10-45637 A | 2/1998 |
| JP | 2000-297114 A | 10/2000 |
| JP | 2000-313716 A | 11/2000 |
| JP | 2000-313717 A | 11/2000 |
| JP | 2002-145924 A | 5/2002 |
| JP | 2002-532581 A | 10/2002 |
| JP | 2004-43615 A | 2/2004 |

* cited by examiner

*Primary Examiner*—Fred Teskin
(74) *Attorney, Agent, or Firm*—Birch, Stewart, Kolasch & Birch, LLP

(57) ABSTRACT

A specific nonionic surfactant is added to a component mainly comprising hydrocarbons before passing through a heat exchanger in a petrochemical plant or a polyolefin production plant, whereby fouling of the heat exchanger can be efficiently prevented, that is, the performance of the heat exchanger can be prevented from being deteriorated, and long-term operation is feasible without sacrificing the speed of production. The nonionic surfactant is preferably a polyoxyalkylene compound represented by the general formula [I] below, more preferably a compound represented by the general formula [II] below.

$$R^1-O-[CH_2-CH(R^3)-O]_k-R^2 \quad [I]$$

wherein $R^1$, $R^2$ and $R^3$ are selected from a hydrogen atom, a C1 to C20 alkyl group, a C6 to C20 aryl group and a C1 to C20 acyl group, and may be the same or different from each other.

$$HO-(CH_2CH_2O)_m-[CH_2CH(CH_3)O]_n-(CH_2CH_2O)_pH \quad [II]$$

wherein m, n and p each represent the average number of repeating units, and m is in the range of 1 to 20, n is 2 to 50 and p is 1 to 20.

9 Claims, 4 Drawing Sheets

METHOD OF PREVENTING HEAT EXCHANGER FOULING

TECHNICAL FIELD

The present invention relates to a method of preventing the fouling of a heat exchanger which comprises adding 0.01 to 100 weight ppm of nonionic surfactant to a component comprising at least 70 wt % hydrocarbon before cooling the component in the heat exchanger.

BACKGROUND ART

Heat exchange is a unit procedure essential for distillation process systems for organic compounds represented by petrochemical plants and for reaction process systems for organic compounds represented by olefin polymerization reaction. In a heat exchanger for performing heat exchange, however, fouling occurs sometimes to cause obstacles such as a reduction in the heat exchange efficiency of the heat exchanger, an increase in the pressure of a pump, an increase in the energy consumption of the pump, a reduction in the efficiency of separation of components and a reduction in the flow rate of cooling water. As a result, the distillation operation and manufacturing operation are made unstable, and the operation should be terminated in the worst case.

For preventing the fouling of heat exchangers in petroleum refining facilities as a typical example of petrochemical plant, JP-A No. 55-129490 discloses a method which comprises adding 5 to 99 ppm polyalkylene amine to a hydrocarbon stream. However, the polyalkylene amine may be toxic to the human body, and thus its influence on the health of an operator and its contamination of products are worried about. JP-A No. 2004-43615 discloses a method of removing fouling materials by adding a dialkyl sulfide to raw oil, but its influence on the health of an operator and its contamination of products are worried about as well.

Now, attention is paid to the reaction process systems for organic compounds. Polyolefins such as polyethylene, polypropylene, ethylene-α-olefin copolymers and propylene-α-olefin copolymers are produced by a wide variety of known process such as a liquid phase polymerization process and gas-phase polymerization process. Among these polymerization processes, the gas-phase polymerization process gives (co)polymers in the form of particles, and unlike the liquid phase polymerization process, does not need steps such as precipitation and separation of polymer particles from a polymer solution, thus simplifying the production process, and therefore, production of polyolefins by the gas-phase polymerization is extensively carried out in recent years.

In the liquid phase polymerization process and gas-phase polymerization process, polyolefins are produced by (co) polymerizing olefins in the presence of a solid catalyst such as a solid titanium-based Ziegler-Natta catalyst disclosed in, for example, JP-A No. 58-83006 and JP-A No. 7-25946 and a carrier-supported metallocene catalyst disclosed in JP-A No. 2000-297114. In those processes, however, the amount of the product is increased, polymerization heat is usually increased. For removing the heat of polymerization, a method of removing heat in liquid phase polymerization by withdrawing the polymerizing solution once through a pipe etc. to the outside of the system, passing the solution through a heat exchanger (also referred to hereinafter as "intercooler") to cool it, and returning it to the polymerization system may be adopted. There is also employed a method wherein a part of a gas composed of hydrocarbons such as unreacted monomers (also referred to as "hydrocarbon-containing gas") is withdrawn continuously from a gaseous phase during liquid phase polymerization or from the top of a reactor during gas-phase polymerization, then the hydrocarbon-containing gas is cooled in a heat exchanger to remove heat of polymerization, and the gas (and a partially liquefied gas) is returned as polymerizable monomers to the polymerization reactor. However, fouling in the heat exchanger for removing polymerization heat is a serious problem, but at present there is no efficient method of preventing fouling.

Particularly in the gas-phase polymerization process, monomer(s) is (are) fed via a distribution plate from the bottom of a polymerization reactor, whereby a solid catalyst and solid particles consisting of formed polyolefin are fluidized to form a fluidized bed wherein polymerization reaction proceeds. Produced polyolefin is discharged continuously or intermittently from the reactor. However, solid catalyst particles and polyolefin particles differ from one another in particle diameter and properties and are hardly fluidized uniformly under a certain environment in the gas-phase polymerization process. As a result, the hydrocarbon-containing gas withdrawn from the top contains fines of the solid catalyst and polyolefin particles in larger amounts than by the liquid phase polymerization process. The solid catalyst and polyolefin particles may adhere to the heat exchanger to permit undesirable polymerization reaction and side reaction to proceed in the heat exchanger, thus causing a significant reduction in the ability of the heat exchanger to remove heat. As a result, the production speed is reduced, and thus there is a problem that production should be periodically suspended to clean the heat exchanger and remove clogging.

In the gas-phase polymerization process, a solid catalyst such as a solid titanium Ziegler-Natta catalyst and a carrier-supported metallocene catalyst is used, and there is also another problem that the solid catalyst is often poor in fluidity and is charged very easily, thus aggregating the catalyst or adhering to a polymerization reactor wall, to generate a lump of the polymer in the polymerization reactor. By carrying a surfactant on the solid catalyst, the problem of adhesion to the polymerization reactor wall can be solved to a certain extent (for example, JP-A No. 2000-313717 and JP-A No. 2000-313716), but the fouling of a heat exchanger cannot be solved. The polyalkylene amine and dialkyl sulfide used for preventing the fouling of a heat exchanger in a petroleum refining plant is poisonous to the olefin catalyst, and thus a reduction in the reaction efficiency of olefin polymerization reaction and contamination of products therewith are worried about.

The present inventors made extensive study for preventing the fouling of a heat exchanger not only in a polyolefin production plant but also in a petroleum refining plant etc., and as a result they found that a specific nonionic surfactant is added to components mainly comprising hydrocarbons before passing through a heat exchanger thereby efficiently preventing the fouling of the heat exchanger, that is, suppressing a reduction in the performance of the heat exchanger, to achieve stable operation for a long time without sacrificing the speed of production, and the present invention was thereby arrived at.

DISCLOSURE OF INVENTION

The object of the present invention is to provide a method of refining petroleum and a process of producing polyolefins with excellent continuous productivity by reducing or preventing the fouling of a heat exchanger, which is absent in the prior art described above.

The method of preventing the fouling of a heat exchanger according to the present invention is a method of preventing the fouling of a heat exchanger which comprises adding 0.01 to 100 weight ppm nonionic surfactant to component (Z) comprising at least 70 wt % hydrocarbon at a temperature of 0 to 200° C. at a pressure of 0 to 10 MPa before cooling the component (Z) in the heat exchanger.

As the nonionic surfactant according to the present invention, use is made of polyoxyalkylene compounds represented by the following general formula [I], among which typical compounds are polyoxyalkylene glycols represented by the following general formula [II].

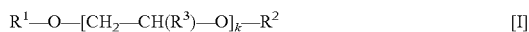

wherein $R^1$, $R^2$ and $R^3$ are selected from a hydrogen atom, a C1 to C20 alkyl group, a C6 to C20 aryl group and a C1 to C20 acyl group, and may be the same or different from each other, and k represents the average number of repeating units and is in the range of 1 to 100.

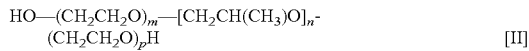

wherein m, n and p each represent the average number of repeating units, and m is in the range of 1 to 20, n is 2 to 50 and p is 1 to 20.

In the fouling prevention method of the present invention, the component (Z) comprising at least 70 wt % hydrocarbon at a temperature of 0 to 200° C. at a pressure of 0 to 10 MPa may be in a gaseous state, a liquid state or a mixed state thereof.

The fouling prevention method of the present invention, upon application to a system wherein the component (Z) comprising at least 70 wt % hydrocarbon is withdrawn from a polymerization reactor for performing (co)polymerization of one or more α-olefins, exhibits excellent efficiency in preventing the fouling of a heat exchanger in the olefin polymerization apparatus.

In the fouling prevention method of the present invention, a nonionic surfactant can be added intermittently or continuously to increase the fouling prevention effect.

BEST MODE FOR CARRYING OUT THE INVENTION

Figure 1:
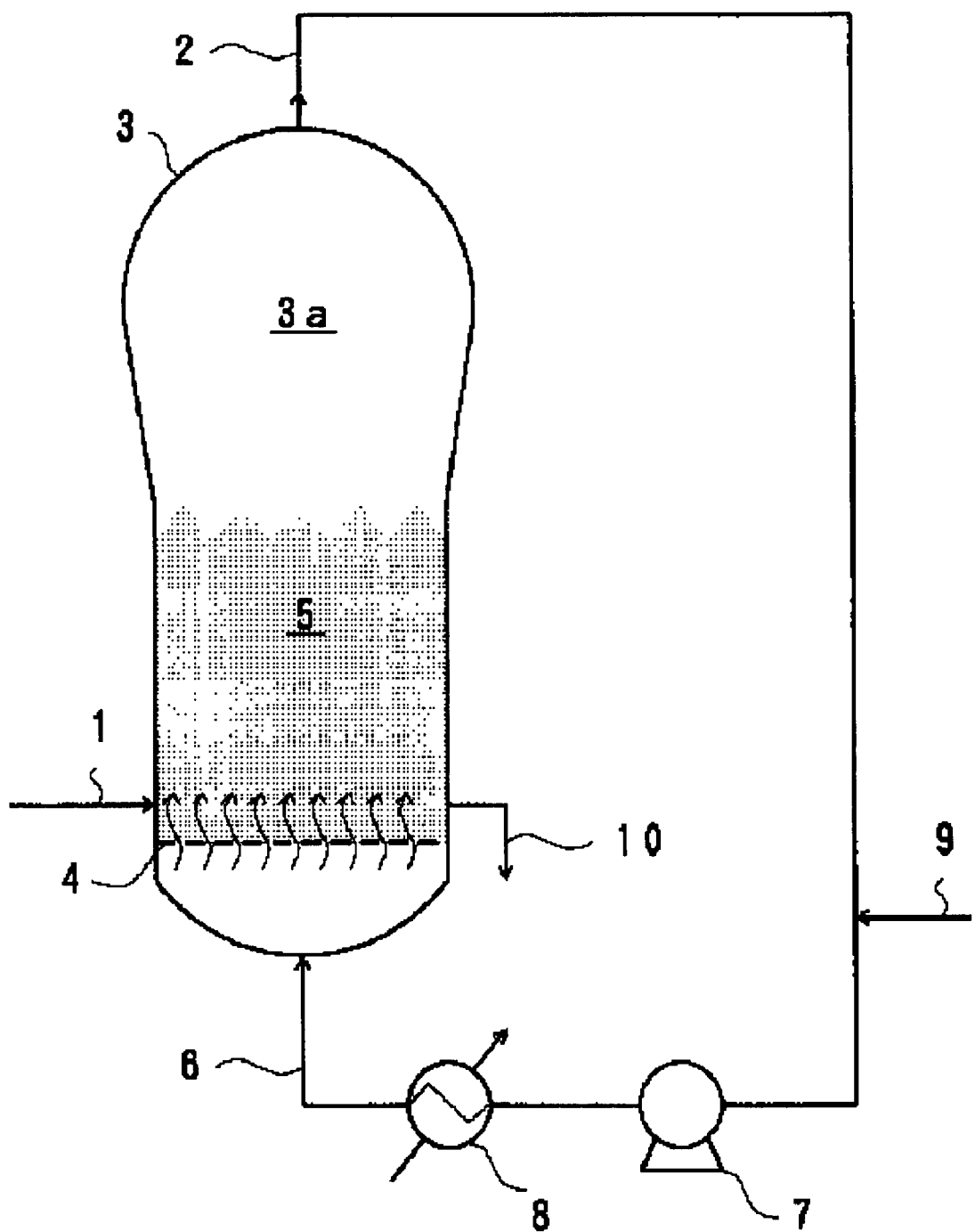
FIG. 1 is a schematic view showing one example of a gas-phase polymerization reaction apparatus in the process of producing polyolefin according to the present invention.

The method of preventing the fouling of a heat exchanger according to the present invention comprises adding 0.01 to 100 weight ppm nonionic surfactant to component (Z) comprising at least 70 wt % hydrocarbon at a temperature of 0 to 200° C. at a pressure of 0 to 10 MPa before cooling the component (Z) in the heat exchanger. The preferable range of the temperature and pressure of the component (Z) passing through a heat exchanger is varied depending on whether the component (Z) is in the state of a liquid phase or in the state of a gaseous phase. When the component (Z) is in the state of a gaseous phase, the temperature and pressure are preferably in the ranges of 20 to 120° C. and 0 to 5 MPa respectively, more preferably 30 to 90° C. and 0 to 4 MPa respectively. When the component (Z) is in the state of a liquid phase, the temperature and pressure are preferably in the ranges of 50 to 180° C. and 0.1 to 5 MPa respectively, more preferably 60 to 160° C. and 0.1 to 3 MPa respectively.

Insofar as the component (Z) comprises at least 70 wt % hydrocarbon, the component (Z) permits the fouling prevention method of the present invention to function effectively. Preferably, it comprises at least 75 wt % hydrocarbon. Other components than the hydrocarbon are varied depending on the process to which the fouling prevention method of the present invention is applied, and examples thereof include impurities such as sulfur compounds contained in water and kerosene, an azeotropic agent etc. in a petroleum refining system, or non-hydrocarbon compounds originating in a catalyst, an inert gas etc. in an olefin polymerization system. In the present invention, the term "hydrocarbon" in the olefin polymerization system is used to encompass olefin oligomer and polymer.

As the nonionic surfactant in the present invention, use is made of a polyoxyalkylene compound represented by the following general formula [I]:

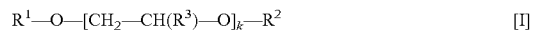

wherein $R^1$, $R^2$ and $R^3$ are selected from a hydrogen atom, a C1 to C20 alkyl group, a C6 to C20 aryl group and a C1 to C20 acyl group, and k represents the average number of repeating units and is in the range of 1 to 100. Specifically, such polyoxyalkylene compounds include polyoxyethylene lauryl ether, polyoxyethylene oleyl ether, polyoxypropylene lauryl ether, polyoxyethylene isodecyl ether, polyoxyethylene castor oil, polyoxyethylene hardened castor oil, polyoxyethylene styrenated phenyl ether, polyoxyethylene oleate, polyoxyethylene distearate, polyoxyethylene glycol, sorbitan sesquioleate, sorbitan monooleate, sorbitan monostearate, sorbitan monolaurate, polyoxyethylene sorbitan monolaurate, polyoxyethylene sorbitan monostearate, polyoxyethylene sorbitan monooleate, polyoxyethylene lanolin alcohol ether, polyoxyethylene lanolin fatty ester, polyoxyethylene alkyl amine ether, polyethylene glycol alkyl ether, polyethylene glycol monolaurate, polyethylene glycol monostearate, polyethylene glycol monooleate, polyethylene glycol sorbitan monolaurate, polyethylene glycol sorbitan monooleate etc. These nonionic surfactants can be used alone or as a mixture of two or more thereof. Among these compounds, the polyoxyalkylene compounds wherein both $R^1$ and $R^2$ are hydrogen atoms, or compounds wherein $R^1$ and/or $R^2$ is a C12 to C18 fatty acyl group, and simultaneously $R^3$ is a hydrogen atom or a methyl group, are used generally for a higher effect of preventing fouling. Use of the nonionic surfactant wherein $R^1$ and/or $R^2$ is an acyl group is limited where the atmosphere around a heat exchanger is alkaline.

Among the polyoxyalkylene compounds represented by the general formula [I], the compounds used as the agent for preventing the fouling of a heat exchanger for removing heat mainly in the gas-phase polymerization reaction system are polyoxyalkylene glycols represented by the following general formula [II]:

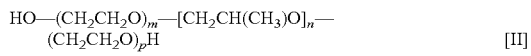

$$\text{HO—(CH}_2\text{CH}_2\text{O)}_m\text{—[CH}_2\text{CH(CH}_3\text{)O]}_n\text{—(CH}_2\text{CH}_2\text{O)}_p\text{H} \qquad [\text{II}]$$

where in m, n and p each represent the average number of repeating units, and m is in the range of 1 to 20, n is 2 to 50 and p is 1 to 20. The total (m+p) of m and p each indicating the number of oxyethylene repeating units represented by (CH$_2$CH$_2$O) in the general formula [II] above is in the range of 2 to 40, preferably 4 to 20, more preferably 4 to 15. The ratio (m/p) of the number of repeating units is 0.1 to 10, preferably 0.5 to 5. On one hand, n indicating the number of oxypropylene repeating units represented by [CH$_2$CH(CH$_3$)O] is in the range of 2 to 50, preferably 10 to 50, more preferably 20 to 50.

The nonionic surfactant is added usually in an amount of 0.01 to 100 weight ppm to the component (Z) passing through a heat exchanger. The amount of the nonionic surfactant added is more preferably 0.05 to 50 weight ppm.

As far as the purpose of preventing fouling of a heat exchanger in the gas-phase polymerization reaction is concerned, the polyoxyalkylene glycols represented by the general formula [II] above are structurally preferably polyethylene oxide/polypropylene oxide copolymers, particularly preferably those wherein the number of ethylene oxide repeating units is 4 to 15 on average and the number of propylene oxide repeating units is 20 to 50 on average.

The nonionic surfactant may be added in the form of either an undiluted liquid or a solution. The method of adding it is arbitrarily determined depending on the amount of the surfactant added and facilities specifications for where the surfactant is added. JP-B No. 8-22883 discloses a method of adding the surfactant in the form of a solution in paraffin (saturated aliphatic hydrocarbon) as solvent, but when paraffin is fed to a fluidized bed reactor in the gas-phase polymerization process or paraffin is fed to a reactor in a bulk polymerization process (liquid phase polymerization process), the paraffin should be separated in a later step or may remain in a final product to adversely affect the qualities of the product. Accordingly, when the fouling prevention method of the present invention is applied to the olefin polymerization system, a copolymerizable C4 to C20 α-olefin comonomer can be used as solvent to prevent the solvent from remaining in a disadvantageous form in the product. When the nonionic surfactant is applied to the gas or liquid phase olefin polymerization reaction, the surfactant is usually dissolved or suspended in an α-olefin comonomer containing 4 to 20 carbon atoms in total, and added in the form of a solution at a concentration of usually 0.5 to 30 wt %, preferably 1 to 20 wt %. When the polymerization is conducted at this concentration, no separation step is necessary, and qualities are not adversely affected. In consideration of convenience in handling, the comonomer is preferably liquid at ambient temperatures and at ambient pressures. Accordingly, the solvent is preferably an unsaturated aliphatic hydrocarbon (comonomer) containing 6 to 10 carbon atoms in total, among the C4 to C20 comonomers (unsaturated aliphatic hydrocarbons), and such unsaturated aliphatic hydrocarbon (comonomer) includes, for example, 1-hexene, 1-heptene, 1-octene, 1-nonene and 1-decene, among which 1-hexene and 1-octene are preferably used. A paraffin-based saturated aliphatic hydrocarbon may also be used together with aforementioned comonomer as a dilution solvent.

The term "dilution" mentioned in the present invention includes every dilution in the form of a mixture or dispersion of the nonionic surfactant and a saturated or unsaturated aliphatic hydrocarbon. That is, the dilution is a solution or dispersion, more specifically a solution, a suspension or an emulsion.

When the nonionic surfactant used in the present invention is used in the form of 0.5 to 30 wt % solution in the unsaturated aliphatic hydrocarbon, the aliphatic unsaturated hydrocarbon containing 4 to 20 carbon atoms in total is a reactive α-olefin comonomer and should be pure in a meaning to prevent a reduction in catalytic activity, and the content of saturated hydrocarbon, internal olefin and water not participating in polymerization is preferably as low as possible. Usually, hydrocarbons having a purity of 95 wt % or more and a water content of 100 weight ppm or less are preferably used, and hydrocarbons having a purity of 97 wt % or more and a water content of 50 weight ppm or less are more preferably used. Preferably, the prepared solution is deoxygenated by bubbling with nitrogen and then fed to the polymerization system. For maintaining the uniform concentration of the solution, a procedure of feeding the solution continuously or intermittently under stirring is preferable.

Hereinafter, the method of preventing the fouling of a heat exchanger according to the present invention is described in more detail by reference to cases wherein the method is applied to a petrochemical plant system as a typical process and to an olefin polymerization reaction system. In these cases, the component (Z) comprising at least 70 wt % hydrocarbon at a temperature of 0 to 200° C. at a pressure of 0 to 10 MPa to pass through a heat exchanger is specifically in a substantially gaseous state and in a substantially liquid state.

As the method wherein the component (Z) is in a gaseous state, the method applied to olefin gas-phase polymerization [Case 1] and to olefin liquid phase polymerization [Case 2] is described. As the method wherein the component (Z) is in a liquid state, the method applied to an intercooler [Case 3] and to a distillation tower for refining hydrocarbons [Case 4] are described.

In the following description, the term "polymerization" of olefins may be used in a meaning to encompass not only homopolymerization but also copolymerization, and the term "polymer" may be used in a meaning to encompass not only homopolymer but also copolymer. In the polymerization process used in each case, polyolefin is produced for example by introducing a solid catalyst into a polymerization reactor and feeding ethylene or ethylene and at least one kind of C3 or more α-olefin copolymerizable with ethylene, or propylene or at least one kind of C2 or more α-olefin copolymerizable with propylene. The olefin which can be used in combination with ethylene or propylene includes C2 to C20 α-olefins such as 1-butene, 1-pentene, 1-hexene, 4-methyl-1-pentene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. If necessary, other polymerizable monomers, for example vinyl monomers such as styrene, vinyl chloride, vinyl acetate, vinyl acrylate, methyl methacrylate, tetrafluoroethylene, vinyl ether and acrylonitrile, conjugated dienes such as butadiene and isoprene, non-conjugated polyenes such as 1,4-hexadiene, dicyclopentadiene and 5-vinyl-2-norbornene, acetylene and its derivatives such as methyl acetylene, and aldehydes such as formaldehyde, can also be coexistent in the polymerization.

[Case 1] Application to a Heat Exchanger for Cooling a Circulating Gas in Gas-Phase Polymerization

[Case 1] is concerned with a method of removing heat by withydrawing a part of a hydrocarbon-containing gas at a temperature of 20 to 120° C. (preferably 30 to 90° C.) and a pressure of 0 to 10 MPa (preferably 0 to 4 MPa) continuously from the top of a reactor in the gas-phase polymerization process and cooling the hydrocarbon-containing gas in a heat exchanger, wherein 0.01 to 100 weight ppm nonionic surfactant is added to the hydrocarbon-containing gas before introduction into the heat exchanger. The cooled hydrocarbon-containing gas is partially liquefied depending on the conditions, and both the gas and liquefied gas are returned again to the polymerization reactor. In the polymerization process, a solid catalyst described later is used in, for example, a gas-phase polymerization reaction apparatus shown in FIG. 1. In (co)polymerization of olefin by the gas-phase olymerization reaction apparatus, a solid catalyst is fed in the state of solid powder for example via a feed line 1 to a fluidized bed reactor 3. A gaseous olefin is continuously fed for example through a feed gas line 9, blown via a circulating gas line 6 by a circulating gas blower 7 into the bottom of the fluidized bed reactor 3, and passed through a gas distribution plate 4 such as a porous plate. A fluidized bed (reaction system) 5 is thereby maintained in a fluidized state.

The olefin blown into the fluidized bed 5 containing the solid catalyst maintained in a fluidized state is reacted and polymerized to form polymer powder (polyolefin powder). The formed polyolefin powder is discharged intermittently or continuously via a polymer discharge line 10 from the fluidized bed reactor 3. The unreacted gaseous olefin (hydrocarbon-containing gas) etc. passing through the fluidized bed 5 is decelerated with decelerator 3a arranged in an upper part of the fluidized bed reactor 3 and discharged via a discharge line 2 to the outside of the fluidized bed reactor 3, then deprived of polymerization heat in a heat exchanger 8, and circulated via the circulating gas line 6 again into the fluidized bed 5. A molecular-weight regulator such as hydrogen can be fed via an arbitrary place of the gas-phase polymerization reaction apparatus, for example via the feed gas line 9.

When the present invention is applied to the process of polymerizing olefins by using the gas-phase polymerization reaction apparatus, the nonionic surfactant is fed preferably before the heat exchanger 8.

[Case 2] Application to a Heat Exchanger for Cooling a Circulating Gas in Liquid Phase Polymerization

Figure 2:
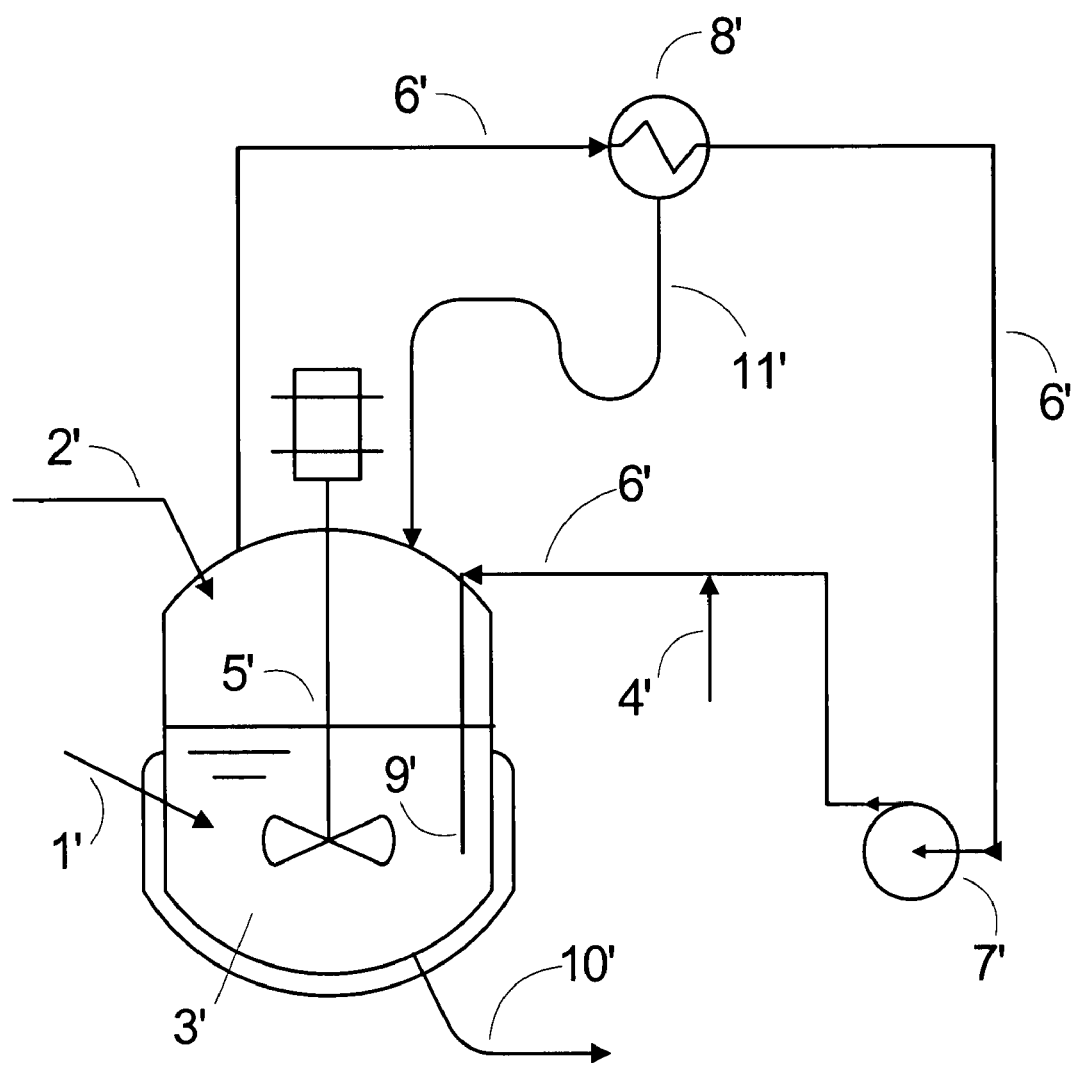
FIG. 2 is a schematic view showing one example of a liquid phase polymerization reaction apparatus in the process of producing polyolefin according to the present invention.

[Case 2] is the case where a circulating gas in liquid phase polymerization is passed through a heat exchanger to remove heat. When olefins are (co)polymerized in a liquid phase polymerization reaction apparatus shown in FIG. 2, a solid catalyst is fed in the state of slurry or powder for example via a feed line 1' to a liquid phase in a polymerization reactor 3'. A gas or liquid olefin is fed continuously through e.g. a feed line 2'. There are two processes, one of which is a bulk polymerization process wherein an olefin monomer to be polymerized is condensed and the condensed olefin monomer itself acts as a solvent in the liquid phase and the other of which is a process wherein a paraffin-based solvent is used; in both cases, the resulting polymer (i.e. solid polyolefin particles) occurs in the solvent, that is, in a slurry state, and the polymerization reaction of the olefin monomer proceeds with the fed solid catalyst.

The polymer in such a slurry state is stirred with a stirrer 5', and the formed polymer is discharged intermittently or continuously via a discharge line 10' from the polymerization reactor 3'.

In the liquid phase polymerization reaction apparatus, a part of the gaseous phase composed of the unreacted monomer gas (hydrocarbon-containing gas) at a temperature of 50 to 180° C. (preferably 60 to 160° C.) and a pressure of 0.1 to 5 MPa (preferably 0.5 to 3 MPa) is withdrawn continuously from a circulating gas line 6' to remove heat of polymerization with a heat exchanger 8', and then circulated through the circulating gas line 6' by blower 7' and returned via a gas inlet nozzle 9' in the polymerization reactor 3' into the liquid phase. A part of the gas from which polymerization heat was removed by the heat exchanger 8' is liquefied. The liquefied gas is circulated again via a liquefied gas circulating line 11' into the gaseous phase or liquid phase in the polymerization reactor 3'. A molecular-weight regulator such as hydrogen can be fed from an arbitrary place of the liquid phase polymerization reaction apparatus, for example, a feed gas line 2', a feed line 4' of a circulating line 6' downstream of blower 7', etc. A cocatalyst such as organoaluminum, or an electron donor, can also be fed from an arbitrary place, for example, as hydrogen, a catalyst feed line 1', the feed line 4' of the circulating line 6' downstream of the blower, the gas feed line 2', etc.

When the present invention is applied to the process for polymerizing olefins by using the liquid phase polymerization reaction apparatus, the nonionic surfactant is fed preferably to the circulating gas line 6' before the heat exchanger 8'.

[Case 3] Application to an Intercooler

Figure 3:
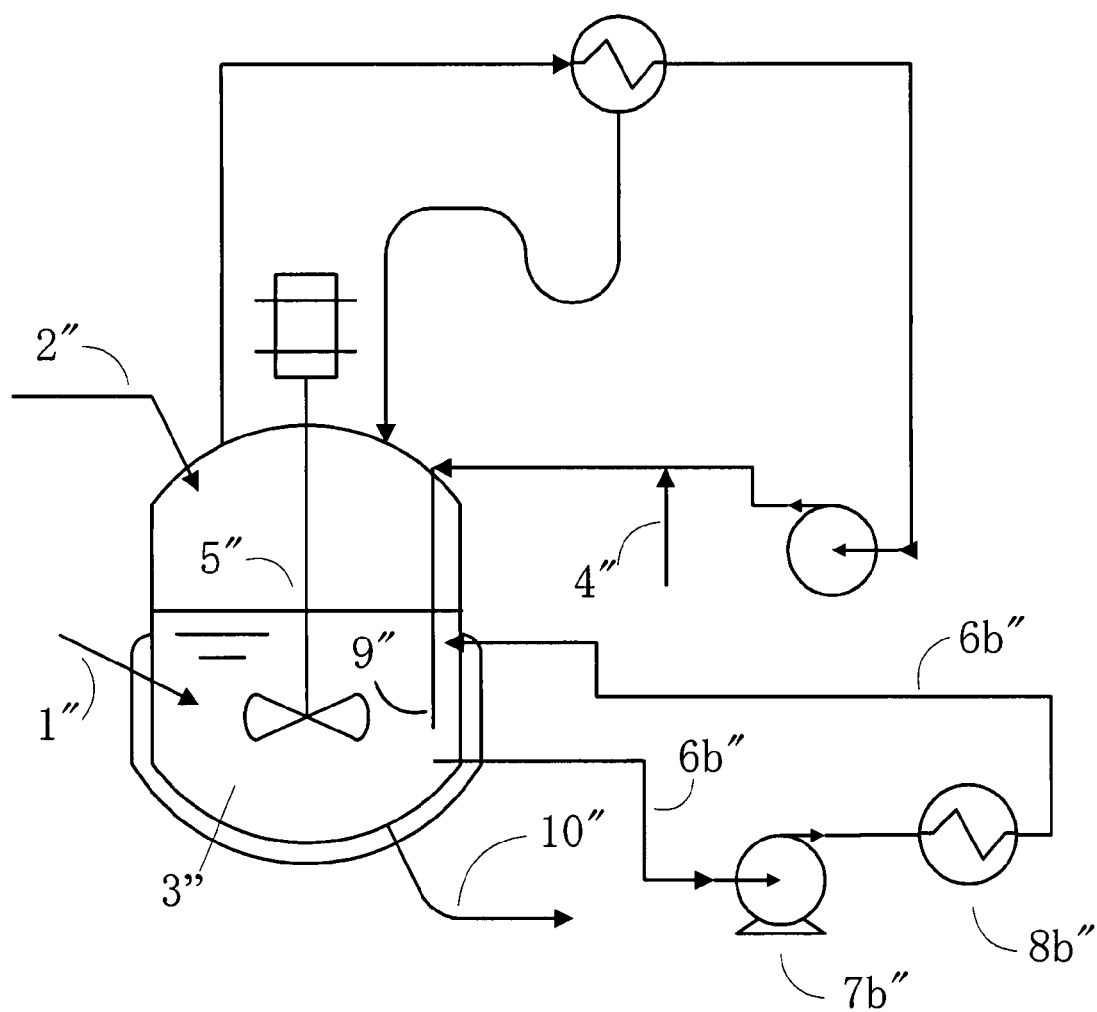
FIG. 3 is a schematic view showing one example of a liquid phase polymerization reaction apparatus equipped with an intercooler in the process of producing polyolefin according to the present invention.

When the removal of heat of polymerization by withdrawing an unreacted gas from the gaseous phase is insufficient or difficult, or heat of polymerization is low in (co)polymerizing olefins by the above-described liquid phase polymerization reaction apparatus, a polymerization apparatus equipped with an intercooler shown in FIG. 3 is used. A part of the liquid phase may be withdrawn directly from a polymerization reactor 3", and the withdrawn liquid phase in a slurry state at a temperature of 50 to 180° C. (preferably 60 to 160° C.) and a pressure of 0.1 to 5 MPa (preferably 0.5 to 3 MPa) is cooled with a heat exchanger 8b" (intercooler) to remove heat of polymerization. The withdrawn liquid phase in a slurry state is returned again via a circulating pump 7b" to the polymerization reactor 3".

When the present invention is applied to the process of polymerizing olefins by using the liquid phase polymerization reaction apparatus, the nonionic surfactant can be fed to an arbitrary place such as polymerization reactor 3', feed line 1", feed line 2" and feed line 4', and is fed most preferably before the heat exchanger 8b".

[Case 4] Application to a Distillation Tower in a Petrochemical Plant

Figure 4:
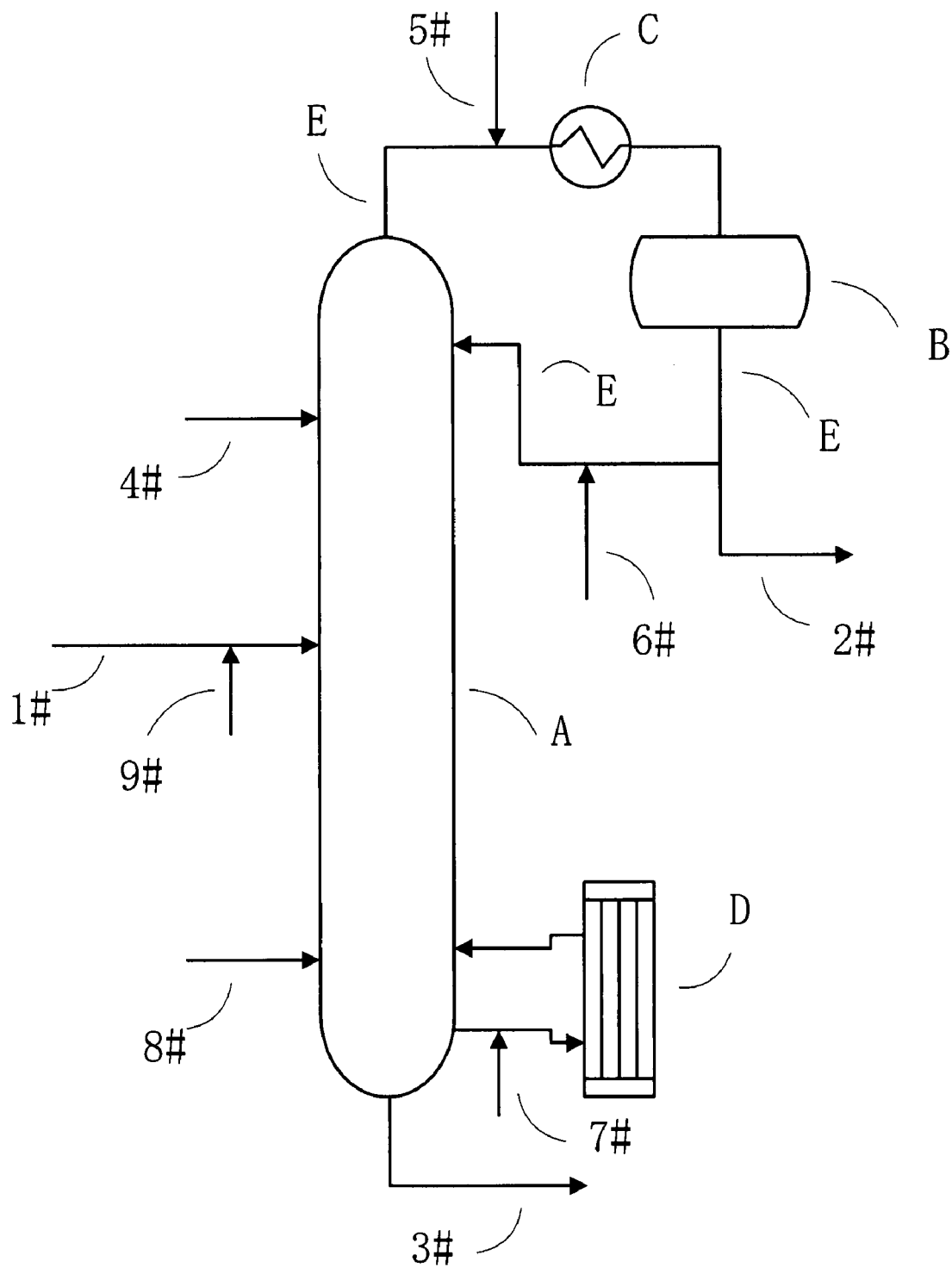
FIG. 4 is a schematic view showing one example of the method of distilling hydrocarbons according to the present invention.

In a petrochemical plant, a distillation tower shown in FIG. 4 is used almost always in refining of products. In the distillation tower where the fouling prevention method of the present invention is applied, a mixture of C3 to C9 paraffin, olefin, diolefin etc. is continuously fed for example through a feed line 1#, and low- and high-boiling compounds are separated and refined in a distillation tower A. The low-boiling compounds are withdrawn from the top E of the distillation tower and condensed in a heat exchanger C (condenser). The condensate is recovered in drum B and a part of the condensate is returned via line E to the top of the tower in order to increase purity. The low-boiling refined product (distillate in the top of the tower) is drawn from line 2#. On the other hand, the high-boiling product (distillate in the bottom of the tower) is withdrawn from line 3#. To increase purity, re-boiler D is arranged in the bottom of the tower. The operation pressure is 0 to 1 MPa, preferably 0.2 to 0.8 MPa. The operation temperature is 20 to 200° C., preferably 50 to 150° C.

For regulating qualities of the refined product, etc., the starting materials may be introduced through feed lines 4#, 5#, 6#, 7#, 8# and 9#.

When the present invention is applied to the process of refining hydrocarbons in a petrochemical plant using such a distillation tower, the nonionic surfactant can also be fed to arbitrary places such as feed lines 1#, 4#, 5#, 6# and 9#, most preferably feed lines 1#, 4#, 6# and 9#, in order to prevent fouling not only in the heat exchanger but also in packing or trays in the distillation tower. In preventing fouling in only the heat exchanger, the nonionic surfactant is fed preferably before the heat exchanger, for example feed lines 5# and 7#.

As the heat exchanger, any known heat exchangers in the form of a multi-tube, a heat pipe, an air cooler, a double tube, a coil-in-box, a cascade and a plate can be used. The present invention can be applied to packing in the distillation tower, for example places for heat exchange such as in packed materials and trays. Particularly, the multi-tube heat exchanger is preferable in the present invention. The heat exchanger may be arranged vertically or horizontally, but the hydrocarbon component subjected to heat exchange is passed preferably in the side of the tube (heat transfer tube).

As the method of feeding the nonionic surfactant, any method of feeding it all at once, intermittently or continuously can be used, but the method of adding it intermittently or continuously is preferable to exhibit the effect of the present invention to the maximum degree. The term "intermittently" means addition at 3-minutes intervals or 10-minutes intervals. The method of adding it continuously is a method of feeding it with no interval.

Specifically, the solid catalyst used in the gas or liquid phase polymerization apparatus includes a carrier-supported metallocene catalyst carried on a particulate carrier as disclosed in JP-A No. 2000-297114 and a solid titanium catalyst disclosed in JP-A No. 58-83006 and JP-A No. 7-25946, and the fouling prevention method of the present invention can be applied to the olefin polymerization system using any catalysts described above. However, when the gas-phase polymerization is carried out using the gas-phase polymerization apparatus, the carrier-supported metallocene catalyst is used preferably to prevent the fouling of the heat exchanger.

The carrier-supported metallocene catalyst is formed from (A) a transition metal compound in the groups 4 to 6 in the periodic table, (B) an organoaluminum oxy compound and (C) a particulate carrier.

The carrier-supported metallocene-catalyst may be preliminarily polymerized, and the carrier-supported metallocene catalyst thus preliminarily polymerized (referred to hereinafter as "preliminarily polymerized metallocene catalyst") is formed from (A) a transition metal compound in the groups 4 to 6 in the periodic table, (B) an organoaluminum oxy compound, (C) a particulate carrier and (D) an olefin polymer formed by preliminary polymerization.

Hereinafter, the respective components forming the solid catalyst for olefin polymerization and the preliminarily polymerized catalyst for olefin polymerization used preferably in the gas-phase polymerization are described in more detail.

(A) Transition Metal Compound

The transition metal compound (A) in the groups 4 to 6 in the periodic table can be exemplified by compounds represented by the following general formula [III]:

$$ML_x \qquad [III]$$

wherein M is at least one kind of transition metal atom selected from the groups 4 to 6 in the periodic table, preferably a transition metal compound in the group 4 in the periodic table, more preferably zirconium, titanium or hafnium; x is the atomic valance of the transition metal, and represents the number of Ls; and L represents a ligand or group with which the transition metal is coordinated.

One embodiment of the transition metal compounds is a transition metal compound wherein at least one of Ls is a ligand having a cyclopentadienyl structure, and other Ls than the ligand having a cyclopentadienyl structure represent one kind of group or atom selected from the group consisting of a C1 to C12 hydrocarbon group, an alkoxy group, an aryloxy group, a trialkylsilyl group, $SO_3R$ (R is a C1 to C8 hydrocarbon group which may have a substituent such as halogen), a halogen atom, and a hydrogen atom. In this case, the ligand having a cyclopentadienyl structure can be exemplified by, for example, a cyclopentadienyl group, an alkyl-substituted cyclopentadienyl group, an indenyl group, an alkyl-substituted indenyl group, a 4,5,6,7-tetrahydroindenyl group and a fluorenyl group. These groups may be substituted with a halogen atom, a trialkylsilyl group etc. When the compound represented by the general formula [III] above contains two or more ligands each having a cyclopentadienyl structure, two of the ligands having a cyclopentadienyl structure may be bound to each other via an alkylene group, a substituted alkylene group, a silylene group, a substituted silylene group or the like. The transition metal compound (A) used is preferably the compound having two ligands each having a cyclopentadienyl structure, more preferably the compound having two ligands each having a cyclopentadienyl structure wherein M is zirconium.

When the method of preventing the fouling of a heat exchanger according to the present invention is used in olefin polymerization reaction, not only the transition metal compounds described above but also transition metal compounds represented by the general formula [IV] below (EP0874005A), transition metal compounds represented by the general formula [V] below (WO2004/029062) and bridged metallocene compounds disclosed in JP-A No. 2004-051801, all of which have been previously disclosed by the present applicant, can also be used without limitation as the transition metal compound (A).

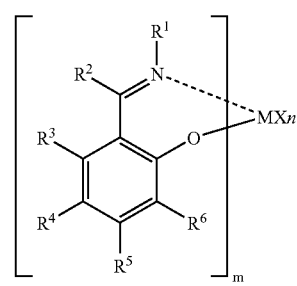

[IV]

wherein M represents a transition metal atom in the groups 3 to 11 in the periodic table, m is an integer of 1 to 6, $R^1$ to $R^6$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, at least of two of which may be bound to one another to form a ring, and when m is 2 or more, two of groups represented by $R^1$ to $R^6$ may be bound to each other provided that $R^1$s are not bound to each other, n is a number satisfying the valence of M, X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups presented by Xs may be the same or different from one another, and a plurality of groups represented by Xs may be bound to one another to form a ring.

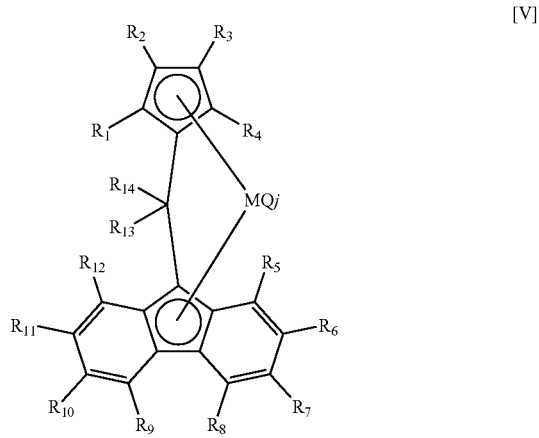

[V]

wherein Y is selected from carbon, silicon, germanium and tin atoms, M is Ti, Zr or Hf, $R^1$, $R^2$, $R^3$, $R^4$, $R^5$, $R^6$, $R^7$, $R^8$, $R^9$, $R^{10}$, $R^{11}$ and $R^{12}$ each are selected from hydrogen, a hydrocarbon group and a silicon-containing group, and may be the same or different from one another, adjacent substituents among $R^5$ to $R^{12}$ may be bound to each other to form a ring, $R^{13}$ and $R^{14}$ are selected from a hydrocarbon group and a silicon-containing group, and may be the same or different from each other, and $R^{13}$ and $R^{14}$ may be bound to each other to form a ring, provided that when all $R^5$, $R^6$, $R^7$, $R^8$, $R^9$, $R^{10}$, $R^{11}$ and $R^{12}$ are hydrogen atoms or when both $R^6$ and $R^{11}$ are hydrocarbon groups, $R^{13}$ and $R^{14}$ are hydrocarbon groups other than a phenyl group, methyl group and cyclohexylidene group, and when both $R^7$ and $R^{10}$ are hydrocarbon groups, $R^{13}$ and $R^{14}$ are hydrocarbon groups other than a phenyl group and methyl group; and Q may be selected in a combination of the same or different neutral ligands which can be coordinated with a halogen, a hydrocarbon group, an anion ligand or a lone pair of electrons, and j is an integer of 1 to 4.

(B) Organoaluminum Oxy Compound

Specifically, the organoaluminum oxy compound (B) includes conventionally known aluminoxane and the benzene-insoluble organoaluminum oxy compounds illustrated in JP-A No. 2-78687.

(C) Particulate Carrier

Specifically, the particulate carrier (C) includes $SiO_2$, $Al_2O_3$, MgO, $ZrO_2$, $TiO_2$, $B_2O_3$, CaO, ZnO, BaO and $ThO_2$ or mixtures containing them, for example inorganic carriers such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO, and organic carriers such as polyethylene, polypropylene, poly-1-butene, poly-4-methyl-1-pentene and styrene-divinyl benzene copolymers.

The average particle diameter of the particulate carrier (C) is desirably in the range of 1 to 300 µm, preferably 10 to 200 µm.

(E) Organoaluminum Compound

The carrier-supported metallocene catalyst and preliminarily polymerized catalyst used in the present invention comprise the transition metal compound (A), the organoaluminum oxy compound (B) and the particulate carrier (C) as essential components and if necessary the organoaluminum compound (E).

The organoaluminum compound (E) can be exemplified for example by organoaluminum compounds represented by the following general formula [VI]:

$R^a{}_nAlX_{3-n}$ [VI]

wherein $R^a$ represents a C1 to C12 hydrocarbon group, X represents a halogen atom or a hydrogen atom, and n is 1 to 3.

The organoaluminum compound (E) is specifically trimethyl aluminum, triethyl aluminum, triisopropyl aluminum or triisobutyl aluminum.

As the organoaluminum compound (E), use can also be made of compounds represented by the following general formula [VII]:

$R^a{}_nAlY_{3-n}$ [VII]

wherein $R^a$ has the same meaning as defined in formula [VI] above, Y represents an —$OR^b$ group, —$OSiR^c{}_3$ group, —$OAlR^d{}_2$ group, —$NR^e{}_2$ group, —$SiR^f{}_3$ group or $N(R^g)AlR^h{}_2$ group, n is 1 to 2, $R^b$, $R^c$, $R^d$ and $R^h$ each represent a methyl group, ethyl group, isopropyl group, isobutyl group, cyclohexyl group, phenyl group etc., $R^e$ represents a hydrogen atom, methyl group, ethyl group, isopropyl group, phenyl group, trimethylsilyl group etc., and $R^f$ and $R^g$ each represent a methyl group, ethyl group etc.

The carrier-supported metallocene catalyst used in the present invention is formed from the transition metal compound (A), the organoaluminum oxy compound (B) and the particulate carrier (C), and can be prepared by mixing and contacting the transition metal compound (A), the organoaluminum oxy compound (B) and the particulate carrier (C) with one another.

The order of contacting the respective components is selected arbitrarily, and preferably it is selected to mix and contact the transition metal compound (A), the organoaluminum oxy compound (B) and the particulate carrier (C) in an inert hydrocarbon solvent or an olefin medium. When the respective components are mixed and contacted with one another, the organoaluminum compound (E) can further be added.

The inert hydrocarbon solvent used in preparation of the carrier-supported metallocene catalyst is specifically an aliphatic hydrocarbon such as propane, butane, pentane, hexane, heptane, octane, decane, dodecane and kerosene, an aliphatic hydrocarbon such as cyclopentane, cyclohexane and methyl cyclopentane, an aromatic hydrocarbon such as benzene, toluene and xylene, a halogenated hydrocarbon such as ethylene chloride, chlorobenzene and dichloromethane, or a mixture thereof.

In preparation of the carrier-supported metallocene catalyst, the transition metal compound (A) is used in an amount of usually 0.001 to 1.0 mmol (in terms of transition metal atom), preferably 0.005 to 0.5 mmol, and the organoaluminum oxy compound (B) is used in an amount of usually 0.1 to 100 mmol, preferably 0.5 to 20 mmol, per g of the particulate carrier (C). When the organoaluminum compound (E) is used, it is used in an amount of usually 0.001 to 1000 mmol, preferably 2 to 500 mmol, per g of the particulate carrier (C).

The temperature in mixing and contacting the respective compounds is usually $-50°$ C. to $150°$ C., preferably $-20°$ C. to $120°$ C., and the contact time is 1 to 1000 minutes, preferably 5 to 600 minutes.

In the carrier-supported metallocene catalyst obtained in this manner, it is desired that per g of the particulate carrier (C), the transition metal compound (A) is carried in an amount of about $5 \times 10^{-6}$ to $10^{-3}$ mole, preferably $10^{-5}$ to $3 \times 10^{-4}$ mole, in terms of transition metal atom, and the organoaluminum oxy compound (B) is carried in an amount of about $10^{-3}$ to $10^{-1}$ mole, preferably $2 \times 10^{-3}$ to $5 \times 10^{-2}$ mole, in terms of aluminum metal atom.

The preliminarily polymerized metallocene catalyst is formed from the transition metal compound (A), the organoaluminum oxy compound (B), the particulate carrier (C), and the olefin polymer formed by preliminary polymerization (D).

The method of preparing the preliminarily polymerized metallocene catalyst includes, for example, a method wherein a small amount of olefin is preliminarily polymerized with a solid catalyst component obtained by mixing and contacting the transition metal compound (A), the organoaluminum oxy compound (B) and the particulate carrier (C) with one another in an inert hydrocarbon solvent or an olefin medium.

In preparation of the solid catalyst component and/or in the preliminary polymerization, the organoaluminum compound (E) can be used. The inert hydrocarbon solvent used in preparation of the preliminarily polymerized metallocene catalyst includes the same inert hydrocarbon solvent as used in preparation of the carrier-supported metallocene catalyst.

In preparation of the preliminarily polymerized metallocene catalyst, the transition metal compound (A) is used in an amount of usually 0.001 to 1.0 mmol (in terms of transition metal atom), preferably 0.005 to 0.5 mmol, and the organoaluminum oxy compound (B) is used in an amount of usually 0.1 to 100 mmol, preferably 0.5 to 20 mmol, per g of the particulate carrier (C). When the organoaluminum compound (E) is used, it is used in an amount of usually 0.001 to 1000 mmol, preferably 0.01 to 500 mmol, per g of the particulate carrier (C).

In the preliminarily polymerized metallocene catalyst thus obtained, it is desired that per g of the particulate carrier (C), the transition metal compound (A) is carried in an amount of about $5 \times 10^{-6}$ to $10^{-3}$ mole, preferably $10^{-5}$ to $3 \times 10^{-4}$ mole, in terms of transition metal atom, the organoaluminum oxy compound (B) is carried in an amount of about $10^{-3}$ to $10^{-1}$ mole, preferably $2 \times 10^{-3}$ to $5 \times 10^{-2}$ mole, in terms of aluminum metal atom, and the olefin polymer obtained by preliminary polymerization (D) is carried in an amount of about 0.1 to 500 g, preferably 0.3 to 300 g, particularly preferably 1 to 100 g.

Polymerization of olefins by using the carrier-supported metallocene catalyst and the preliminarily polymerized metallocene catalyst is carried out by gas-phase and liquid phase polymerization. In polymerization, the organoaluminum oxy compound (B) and/or the organoaluminum compound (E), which are not carried on the particulate carrier (C), may be further used.

When the gas-phase and liquid phase polymerization is carried out, the temperature of olefin polymerization is desirably in the range of usually 0 to $200°$ C., preferably 20 to $180°$ C. The polymerization pressure is usually normal pressures to 5 MPa, preferably normal pressures to 4 MPa, and the polymerization reaction can be carried out in any of batch, semi-batch and continuous processes.

The olefin which can be polymerized by the carrier-supported metallocene catalyst and the preliminarily polymerized metallocene catalyst includes C2 to C20 α-olefins such as ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene, and C3 to C20 cyclic olefins such as cyclopentene, cycloheptene, norbornene, 5-methyl-2-norbornene and tetracyclododecene. Further, styrene, vinyl cyclohexane and diene can be used.

According to the present invention, the nonionic surfactant is added to the hydrocarbon component before passing through a heat exchanger, whereby fouling of the heat exchanger can be prevented without adhesion of the fines of solid catalyst or polyolefin particles, to allow a high speed of production to be continued secularly thereby significantly improving the efficiency of production of polyolefin. Further, the method of feeding the nonionic surfactant has a high degree of freedom, to achieve easy and economical supply of the nonionic surfactant.

Hereinafter, the present invention is described in more detail by reference to the Examples, but the present invention is not limited to the Examples.

EXAMPLE 1

Copolymerization of ethylene with 1-hexene was carried out by a fluidized bed gas-phase reactor. The polymerization pressure was 2 MPaG, the polymerization temperature was $75°$ C., and the content of ethylene in a polymerization reactor was 69 mol %. A silica carrier-supported metallocene catalyst [metallocene compound:

bis(1,3-n-butylmethylcyclopentanedienyl) zirconium dichloride] was used as the catalyst and fed to the polymerization reactor such that the speed of production of the polymer became 14 tons/hr. Hydrogen was used in regulation of the molecular weight of the polymer. A hydrocarbon-containing gas with a composition consisting of 25.6 mol % nitrogen, 69 mol % ethylene, 2.4 mol % 1-hexene, 3 mol % isopentane and 350 ppm hydrogen was circulated at a flow rate of 27 km³/hr through a circulating gas line. In a multi-tube heat exchanger in the circulating gas line, the hydrocarbon-containing gas was passed in the side of the tube, while 15 wt % 1-hexene solution of 0.1 weight ppm (relative to the circulating gas line) nonionic surfactant polyoxyalkylene glycol (trade name: Pluronic L-71 manufactured by Asahi Denka Co., Ltd.) was continuously fed before the heat exchanger. As the olefin, ethylene and hexene were fed such that the speed of production of the polymer became 14 tons/hr and the polymerization ratio of 1-hexene became 12 wt %. The polymer density was 0.913 g/cm$^3$, and the melt flow was 0.5 g/10 minutes. The melt flow rate was determined at 190° C. under a loading of 2.16 kg according to ASTM D1238-65T.

The degree of fouling of the heat exchanger was judged by observing the differential pressure of a circulating gas blower. An increase in the differential pressure indicates that the fouling of the heat exchanger is advancing. The allowable differential pressure of the blower is 120 kPa.

The operation was performed at this speed of production under these conditions for 3 days, and no influence on catalytic activity was recognized, and the differential pressure of the blower was kept at 80 kPa. That is, the operation was feasible without fouling of the heat exchanger.

COMPARATIVE EXAMPLE 1

Evaluation was conducted in the same manner as in Example 1 except that the nonionic surfactant was not added.

The operation was continued for 3 days, during which the differential pressure of the blower was increased by 20 kPa to 100 kPa. Fouling of the heat exchanger proceeded, and the allowable differential pressure of the blower was 120 kPa, and thus the operation was feasible for an additional few days under the conditions in Comparative Example 1.

EXAMPLE 1(b)

Evaluation was conducted in the same manner as in Example 1 except that the position for feeding the nonionic surfactant was changed directly from the multi-tube heat exchanger to the fluidized bed gas-phase polymerization reactor.

The operation was performed for 3 days, during which no influence on catalytic activity was recognized, but the differential pressure of the blower was increased by 10 kPa to 90 kPa. A certain effect was achieved by adding the surfactant, but this effect was not so high as that achieved by directly feeding it before the heat exchanger, to permit fouling to proceed, and because the differential pressure of the blower was 120 kPa, the operation could be improved to a certain degree under the conditions of Example 1(b) as compared with Comparative Example 1, but the operation was feasible for an additional few days.

Example 2 and Comparative Examples 3 to 5 were carried out on the basis of propylene and the following conditions. That is, copolymerization of ethylene with 1-butene was conducted in hexane as the solvent with two-stage liquid phase polymerization reactors arranged in series. The polymerization was carried out under the conditions shown in Table 1 below. A solid titanium catalyst [magnesium chloride-supported titanium tetrachloride catalyst; the amount of titanium carried, 2.3 wt %] was used as the catalyst and fed to the liquid phase so as to correspond to the speed of production of the polymer in the first-stage polymerization reactor. Triethyl aluminum was used as the cocatalyst and dicyclopentyl dimethoxy silane was used as the electron donor, and these compounds were fed to the liquid phase in only the first-stage polymerization reactor such that the molar ratio (Al/Ti) of the organoaluminum to the catalyst titanium and the molar ratio (Si/Ti) of the silane compound to the catalyst titanium became 50 respectively. The hexane solvent was fed in such an amount that the ratio (slurry concentration) of the polymer to hexane corresponded to the slurry concentration shown in Table 1. Ethylene and 1-butene were fed in such a ratio as to attain the ethylene content and 1-butene content in the polymer shown in Table 1. Hydrogen was used for regulation of the molecular weight of the polymer. Physical properties of the resulting polymer are shown in Table 1. Melt flow rate (MFR) was determined at 230° C. under a loading of 2.16 kg according to JIS 7210.

In the first-stage polymerization reactor, the gas in the gaseous phase was withdrawn at a flow rate of 2.7 km$^3$/hr into a multi-tube heat exchanger such that the hydrocarbon-containing gas was passed in the side of the tube to remove the heat of polymerization reaction, and the condensate was returned to the liquid phase, while the cooled gas was returned via a circulating blower to the polymerization reactor. From the second-stage polymerization reactor, a part of the liquid phase was withdrawn in an amount of 300 m$^3$/h at a flow rate of 5 m/s so that the heat of polymerization reaction heat was removed with an intercooler. The cooled slurry was returned by a circulating pump to the liquid phase in the polymerization reactor.

TABLE 1

Operational data on the two-stage liquid phase polymerization reactors

| | (Units) | First-stage polymerization reactor | Second-stage polymerization reactor |
|---|---|---|---|
| Pressure | MpaG | 0.76 | 0.35 |
| Temperature | ° C. | 65 | 67 |
| Production of polymer rate | ton/hr | 5.0 | 7.5 |
| Gas composition in gaseous phase | — | — | — |
| Propylene | mol % | 81 | 63 |
| Ethylene | mol % | 6 | 12 |
| 1-Butene | mol % | 2 | 2 |
| Hydrogen | mol % | 7 | 15 |
| Nitrogen | mol % | 4 | 8 |
| Slurry concentration | g-PP/L | 210 | 290 |
| Ethylene content | mol % | 2 | 1.6 |
| 1-Butene | mol % | 1.6 | 2.1 |
| MFR | g/10 min | 4.2 | 4.8 |
| Melting point | ° C. | — | 141 |
| Retention time | Hr | 1.5 | 1.5 |

The slurry in the first-stage polymerization reactor was continuously discharged and sent to the second-stage polymerization reactor where the polymerization reaction was continued. The slurry was also continuously discharged from the second-stage polymerization reactor. The slurry was discharged in such a rate as to satisfy the conditions shown in Table 1.

In the first-stage polymerization reactor, the state of fouling of the heat exchanger was judged by examining the flow rate of the circulating gas blower. On the other hand, the state of fouling of the intercooler in the second-stage polymerization reactor was judged by examining the electric power (electric current) consumed by the circulating pump.

EXAMPLE 2

30 wt % hexane solution of 0.2 wt ppm (relative to the circulating material) nonionic surfactant polyoxyalkylene glycol (trade name: Pluronic L-71 manufactured by Asahi Denka Co., Ltd.) was fed continuously before the heat exchanger of the first-stage polymerization reactor and before the intercooler of the second-stage polymerization reactor.

The operation was continued at this production rate under these conditions for 7 days, during which the flow rate of the circulating gas blower was kept at 2700 m³/h (allowable: 2500 m³/h). The electric current of the circulating pump of the intercooler in the second-state polymerization reactor could also be kept at 120 Amp (allowable: 135 Amp). That is, the operation was feasible without fouling of the heat exchanger and the intercooler.

COMPARATIVE EXAMPLE 3

Evaluation was carried out under the same conditions as in Example 2 except that the nonionic surfactant was not added to the intercooler in the second-stage polymerization reactor.

The operation was continued at this speed of production under these conditions for 7 days, during which the flow rate of the circulating gas blower in the first-stage polymerization reactor could reproduce the flow rate in Example 2, but the electric current of the circulating pump of the intercooler in the second-state polymerization reactor was increased to 128 Amp (allowable: 135 Amp). That is, the progress of fouling of the intercooler was indicated, resulting in limitation of the number of days for which the operation was feasible.

COMPARATIVE EXAMPLE 4

Evaluation was carried out under the same conditions as in Example 2 except that the nonionic surfactant was not added to the heat exchanger in the first-stage polymerization reactor.

The operation was continued at this speed of production under these conditions for 7 days, during which the electric current of the circulating pump in the second-stage polymerization reactor could reproduce the flow rate in Example 2, but the flow rate of the circulating blower of the heat exchanger in the first-stage polymerization reactor was decreased to 2600 m³/h (allowable: 2500 m³/h). That is, the progress of fouling of the heat exchanger was indicated, resulting in limitation of the number of days for which the operation was feasible.

COMPARATIVE EXAMPLE 5

No ionic surfactant was added.

The operation was continued at this speed of production under these conditions for 7 days, during which the flow rate of the circulating gas blower in the first-stage polymerization reactor was increased as shown in Comparative Example 4, while the electric current of the circulating pump in the second-stage polymerization reactor was increased as shown in Comparative Example 3, resulting in limitation of the number of days for which the operation was feasible.

EXAMPLE 3

A mixture of C3 to C9 paraffin, olefin and diolefin was fed at 100 t/h to a tray distillation tower wherein the temperature was regulated at 26° C. at 0.74 MPa in the top of the tower and at 74° C. in the bottom of the tower. The top of the tower was provided with a condenser and a drum for recovering a condensate, and the purity of C3 in a distillate in the top of the tower was 99%. The condensate was returned to the top of the tower at a weight ratio of 1/1 to the distillate drawn at 50 t/h. A distillate in the bottom of the tower was drawn at 50 t/h, and a re-boiler was regulated such that the temperature of the bottom of the tower became 74° C.

30 wt % hexane solution of a nonionic surfactant polyoxyalkylene glycol (trade name: Pluronic L-71 manufactured by Asahi Denka Co., Ltd.) at a concentration of 0.2 wt ppm based on the amount of the starting material to be fed was continuously fed.

Fouling was evaluated, in terms of the chest pressure of the re-boiler and the differential pressure between the tower top and tower bottom.

The operation was continued for half a year under these conditions, during which the differential pressure of the tower was kept at 35 kPa, and no change was recognized in the chest pressure of the re-boiler.

COMPARATIVE EXAMPLE 6

Evaluation was conducted under the same conditions as in Example 3 except that the nonionic surfactant was not added.

The operation was continued for half a year under these conditions, under which the chest pressure was increased from 40 kPa to 100 kPa, and the differential pressure of the tower was also increased by 20 kPa. Because the allowable chest pressure was 150 kPa, the operation could not be continued a few days later.

INDUSTRIAL APPLICABILITY

A specific nonionic surfactant is added to a component mainly comprising hydrocarbons before passing through a heat exchanger, whereby fouling of the heat exchanger can be efficiently prevented, that is, the performance of the heat exchanger can be prevented from being deteriorated, and long-term operation is feasible without sacrificing the speed of production. This method of preventing fouling can be applied widely to heat exchangers in a petrochemical plant and a polyolefin production plant.

The invention claimed is:

1. A method of preventing the fouling of a heat exchanger, which comprises adding 0.01 to 100 weight ppm of a nonionic surfactant to component (Z) comprising at least 70 wt % hydrocarbon at a temperature of 0 to 200° C. at a pressure of 0 to 10 MPa before cooling the component (Z) in the heat exchanger, wherein the nonionic surfactant is a polyoxyalkylene compound represented by the following general formula [II]:

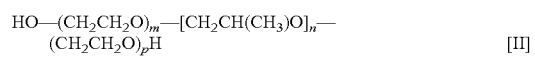

wherein m, n and p each represent the average number of repeating units, and m is in the range of 1 to 20, n is 2 to 50 and p is 1 to 20.

2. The method of preventing the fouling of a heat exchanger according to claim 1, wherein the component (Z) comprising at least 70 wt % hydrocarbon at a temperature of 0 to 200° C. at a pressure of 0 to 10 MPa is in a gaseous state.

3. The method of preventing the fouling of a heat exchanger according to claim 1, wherein the component (Z) comprising at least 70 wt % hydrocarbon at a temperature of 0 to 200° C. at a pressure of 0 to 10 MPa is in a liquid state.

4. A method of preventing the fouling of a heat exchanger, which comprises adding 0.01 to 100 weight ppm of a nonionic surfactant to component (Z) comprising at least 70 wt % hydrocarbon at a temperature of 0 to 200° C. at a pressure of 0 to 10 Mpa before cooling the component (Z) in the heat exchanger, wherein the component (Z) is drawn from a polymerization reactor for performing (co)polymerization of one or more α-olefins.

5. The method of preventing the fouling of a heat exchanger according to any one of claims 1 or 4, wherein the nonionic surfactant is added intermittently or continuously.

6. The method of preventing the fouling of a heat exchanger according to claim 1, wherein the polyoxyalkylene compound represented by general formula (II) is added to an upstream point of the heat exchanger.

7. The method of preventing the fouling of a heat exchanger according to claim 1, wherein component (Z) comprises at least 75% hydrocarbon.

8. The method of preventing the fouling of a heat exchanger according to claim 1, wherein the amount of the polyoxyalkylene compound of general formula (II) added is from 0.05 to 50 weight ppm.

9. A method of preventing the fouling of a heat exchanger which comprises adding 0.01 to 100 weight ppm of a polyoxyalkylene compound, which is used as a nonionic surfactant and is represented by the following general formula [II]

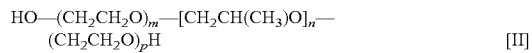

HO—(CH$_2$CH$_2$O)$_m$—[CH$_2$CH(CH$_3$)O]$_n$—(CH$_2$CH$_2$O)$_p$H  [II]

wherein m, n and p each represent the average number of repeating units, and m is in the range of 1 to 20, n is 2 to 50 and p is 1 to 20 to component (Z) comprising at least 70 wt % hydrocarbon at a temperature of 0 to 200° C. at a pressure of 0 to 10 Mpa before cooling the component (Z) in the heat exchanger, wherein the component (Z) is drawn from a polymerization reactor for performing (co)polymerization of one or more α-olefins.

* * * * *